United States Patent [19]

Bigley et al.

[11] Patent Number: 5,586,632
[45] Date of Patent: Dec. 24, 1996

[54] PULSE ACTUATED INTERLOCK MECHANISM

[76] Inventors: Jon Bigley, 43120 Barchester, Canton, Mich. 48187; Evan Baker, 2017 SW. 6th Ave., Camas, Wash. 98607

[21] Appl. No.: 485,784

[22] Filed: Jun. 7, 1995

Related U.S. Application Data

[63] Continuation-in-part of Ser. No. 143,086, Oct. 26, 1993, Pat. No. 5,535,869.

[51] Int. Cl.$^6$ ........................... F16D 11/14; F16D 25/04; B25B 7/12; B60B 5/00
[52] U.S. Cl. .................. 192/69.41; 81/302; 192/69.43; 192/88 A; 192/92; 192/112; 192/114 R; 301/108.3
[58] Field of Search ................ 192/69.41, 69.43, 192/69.4, 92, 112, 88 A, 114 R; 301/108.1, 108.3; 81/302

[56] References Cited

U.S. PATENT DOCUMENTS

| | | |
|---|---|---|
| 2,671,354 | 3/1954 | Goos . |
| 2,928,374 | 3/1960 | Bergonzo . |
| 3,125,363 | 3/1964 | Kapusta . |
| 3,298,357 | 1/1967 | Bross . |
| 3,464,774 | 9/1969 | Vetter . |
| 3,520,554 | 7/1970 | Ravenel ........................... 301/108.3 X |
| 3,653,777 | 4/1972 | Bross . |
| 3,656,598 | 4/1972 | Goble . |
| 3,679,317 | 7/1972 | Larson . |
| 3,709,343 | 1/1973 | Sigg . |
| 4,453,852 | 8/1984 | Gilcrest . |
| 4,625,846 | 12/1986 | Gomez . |
| 4,627,512 | 12/1986 | Clohessy . |
| 4,694,943 | 9/1987 | Petrak . |
| 4,793,457 | 12/1988 | Siewert et al. .......................... 192/112 |
| 4,960,192 | 10/1990 | Kurihara . |
| 5,085,304 | 2/1992 | Barroso . |
| 5,123,513 | 6/1992 | Petrak . |
| 5,141,088 | 8/1992 | Kurihara et al. . |
| 5,148,901 | 9/1992 | Kurihara et al. . |
| 5,353,890 | 10/1994 | Clohessy ........................... 192/69.41 X |
| 5,380,103 | 1/1995 | Lederman ........................... 301/108.3 X |
| 5,413,201 | 5/1995 | Vidal .................................... 192/69.41 |

Primary Examiner—Rodney H. Bonck
Attorney, Agent, or Firm—Klarquist Sparkman Campbell Leigh and Whinston, L.L.P.

[57] ABSTRACT

A pulse actuated interlock mechanism for a vehicle that couples and uncouples a drive member and a driven member. A clutch member is slidably movable to couple or uncouple the drive and driven members. A latchable piston assembly in combination with a return spring is utilized to move the clutch member. A force of short duration of a first magnitude is applied to latch the piston assembly which permits the return spring to move the clutch member to uncouple the drive and driven members. A force of a short duration of a second magnitude which is greater than the first force is applied to unlatch the piston assembly. A biasing member of the piston assembly moves the clutch member to couple the drive and driven members when the piston assembly is in the unlatched condition. The clutch member, return spring and piston assembly are installed in a modular housing. The housing, in a preferred embodiment, is readily fitted and secured to an end of a wheel hub and rotatably supports a drive gear fitted to an end of a drive axle. Selected air pressure is applied to a cavity of the wheel hub and housing to provide the first and second magnitude forces. A tool is utilized to remove the housing from the wheel hub.

11 Claims, 12 Drawing Sheets

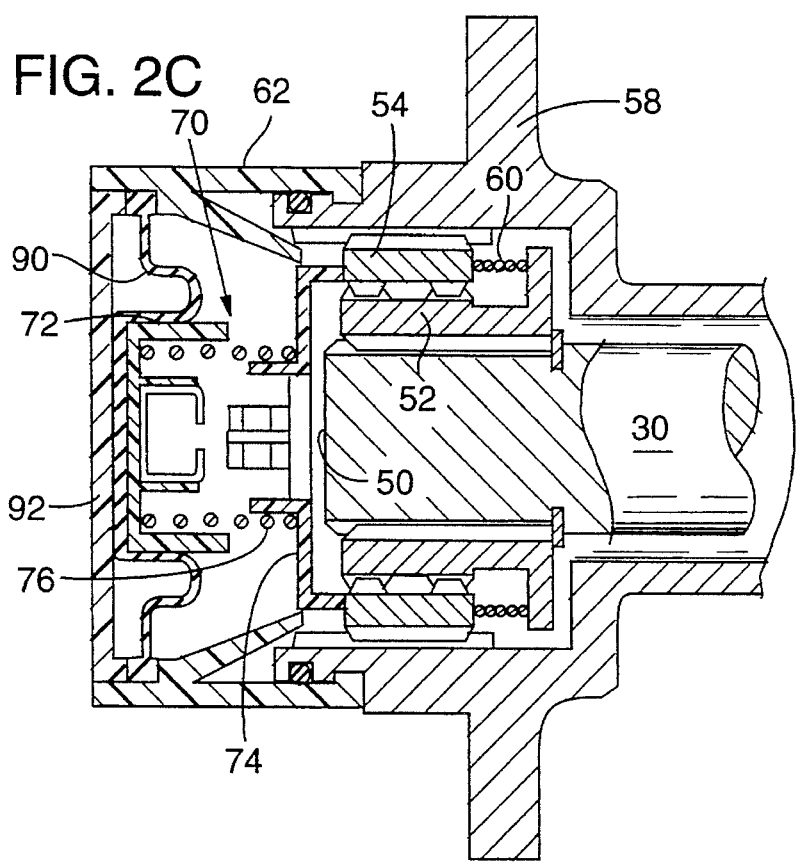
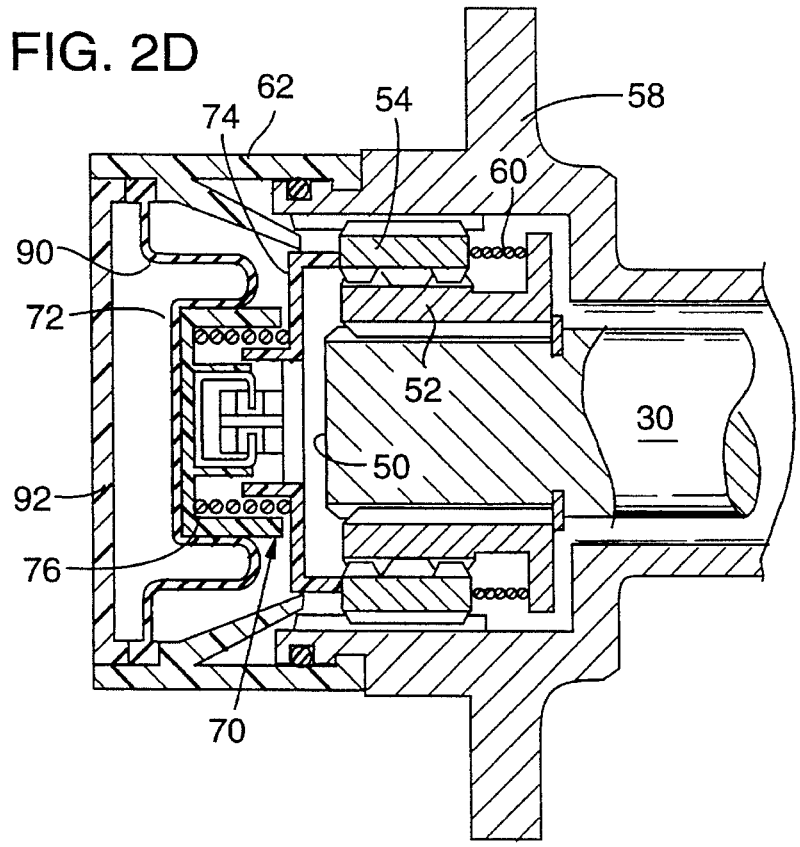

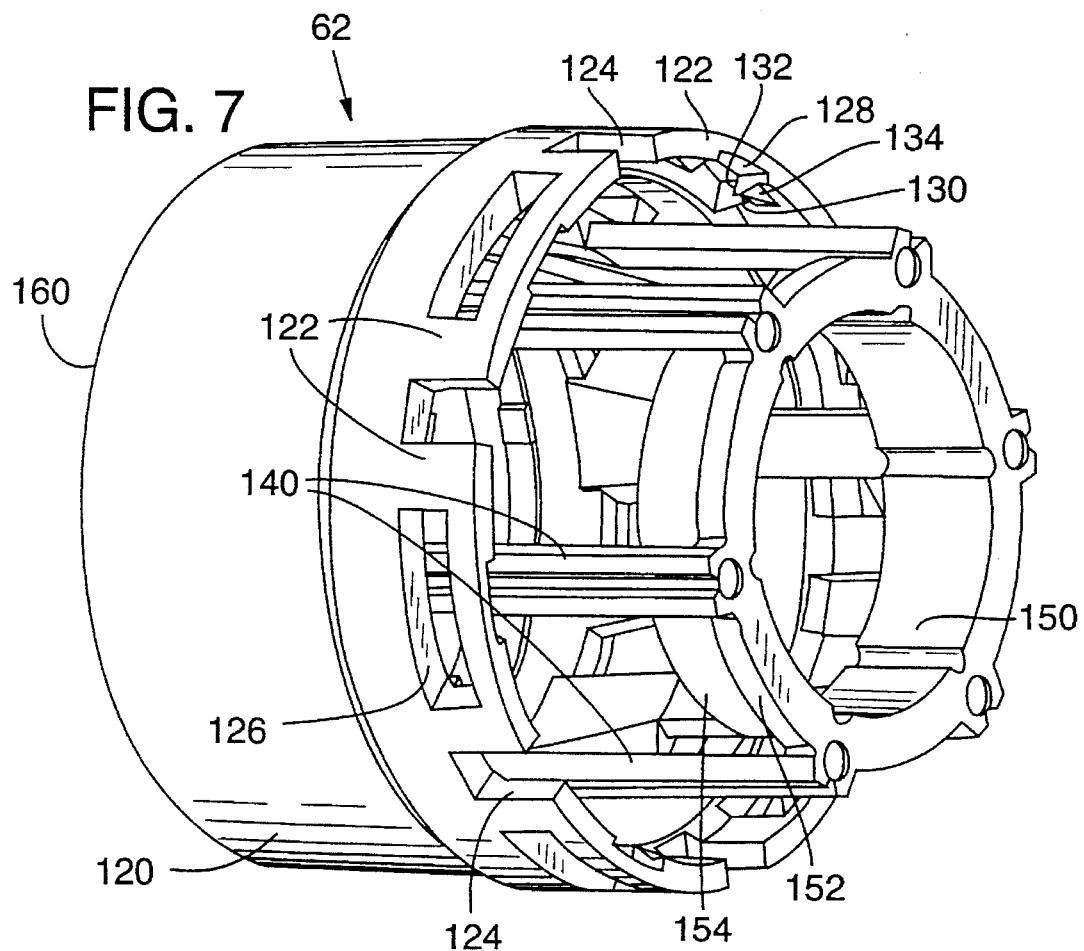
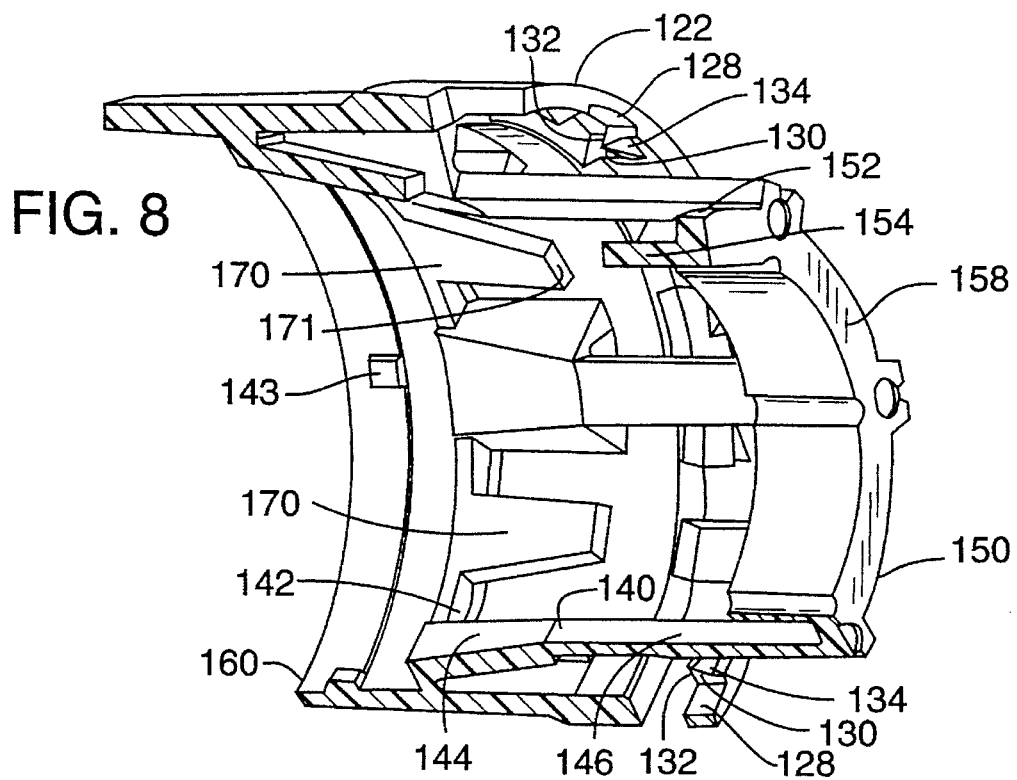

PULSE ACTUATED INTERLOCK MECHANISM

This is a continuation-in-part of U.S. Ser. No. 08/143,086 filed Oct. 26, 1993, now U.S. Pat. No. 5,535,869.

FIELD OF THE INVENTION

This invention relates to a pulse actuated interlock mechanism and more particularly to an actuating mechanism that is independent of the hub body and includes various improved features for mounting the actuating mechanism and related components of the interlock mechanism.

BACKGROUND OF THE INVENTION

An interlock mechanism as contemplated by the present invention is used in the drive line of a vehicle for releasably locking a driven member to a drive member. A specific example is a hub lock (interlock mechanism) for locking and unlocking a wheel hub (a driven member) to a wheel axle (a drive member).

U.S. Ser. No. 08/143,086 teaches an actuating mechanism for actuating a hub lock mechanism that is referred to as a pulse actuated interlock mechanism. The mechanism includes a piston and latch member that responds to a force, e.g., air pressure (negative or positive). The force moves the piston which moves a clutch ring to an interlocking relation with both the driven and drive members. The piston is latched to the latch member. The force is withdrawn whereas the piston is retained in the latched position. (The force which moves the piston to the latched position and is then withdrawn is here referred to as a first pulsating force.) A second pulsating force moves the piston relative to the latch member to release the latched engagement and the piston is returned to a withdrawn position. The clutch ring is moved to an engaged position and a disengaged position in response to unlatching and latching of the piston and latch member.

The latching mechanism relies on relative rotation of the piston and latch members to accomplish latching and unlatching of the piston. The latch member is a cam-like member rotatively fixed and provided on the inner wall of the housing for the interlock mechanism. Whereas the latching mechanism needs to be structured with precision, the component fixed to the inner wall of the housing is difficult to produce without incurring unduly expensive manufacturing processes. Failure to provide such precision affects reliability.

BRIEF DESCRIPTION OF THE PRESENT INVENTION

An objective of the invention is to retain the benefits of the pulsating actuation while simplifying manufacture of the piston and latch mechanism and improving reliability. In the present invention, the piston and latch mechanism are provided by first and second (primary and secondary) pistons that are assembled and function independent of the interlock housing. There is no requirement that the pistons rotate relatively as required by the previous piston and latch mechanism. More importantly, the first and second pistons are a sub-assembly that independently performs the latching function in response to the pulsating forces. They are assembled independent of the housing or interlock mechanism and then mounted to the interlock and housing without any special accommodations required of the interlock and housing. The first and second pulsating forces applied to the sub-assembly produce latching and unlatching of the pistons one to the other and the sub-assembly accordingly expands or contracts to produce interlocking and unlocking of the drive and driven members.

Further improvements in the preferred embodiment of the invention are directed to a hub lock mechanism that provides for a complete sub-assembly of a hub lock and actuating mechanism including a hub lock housing that encases the components. This produces a fully assembled unit that is then readily mounted onto an end of a wheel hub. The housing allows movement for the clutch ring and also limits that movement via a cage-like structure. The housing simply snaps into place onto the wheel hub with a drive gear of the hub lock mechanism mounted onto the axle end. The housing is readily mounted to the wheel hub in a secured position. Additionally, the wheel rim when mounted to the hub surrounds the hub engaging portion of the housing to prevent removal of the housing. The housing is readily removed from the wheel hub, however, (via a tool) with the wheel removed from the wheel hub, i.e., for repair or conversion of the hub lock mechanism.

Other features include a simple conversion to provide manual override, i.e., to override the pulse actuation and establish full time interlock; a one-piece plastic housing that includes a retaining cage for the clutch ring and a bearing for relative rotation of the drive gear (and axle) and housing (and wheel hub). The bearing portion of the housing by reason of it being carried by the housing is free of the torque carrying components. Still further, the unitized actuator provides easy conversion from pulse actuation to manual operation.

These and other advantages and benefits will be better understood with reference to the following detailed description and drawings.

BRIEF DESCRIPTION OF THE DRAWINGS

FIGS. 2A, 2B, 2C and 2D schematically illustrate the concept of pulse actuation;

FIG. 7 is perspective view of a housing;

FIG. 8 is a cut-away view of the housing of FIG. 7;

DESCRIPTION OF THE PREFERRED EMBODIMENT

Figure 1:
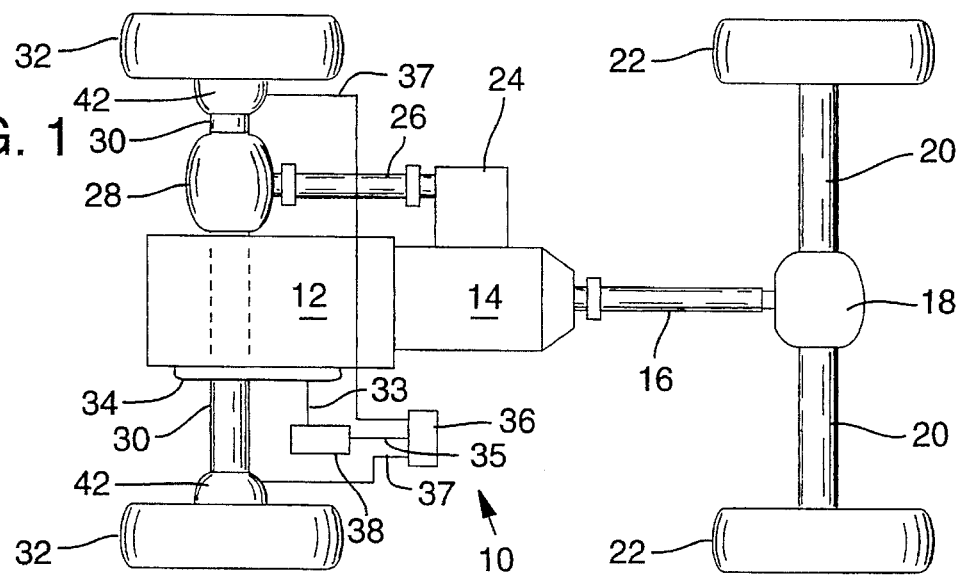
FIG. 1 is a schematic illustration of a vehicle chassis in plan view.

Refer now to FIG. 1 of the drawings which illustrates in plan view a chassis 10 of a vehicle that is arranged to be operated in either two-wheel drive or four-wheel drive mode. The chassis 10 includes a drive motor 12 that is coupled to a transmission 14. A drive shaft 16 connects the transmission to a rear differential 18 and the rear differential 18 has axles 20 extending to rear wheels 22. A transfer case 24 is coupled to the transmission 14 and couples/uncouples a front drive shaft 26 to a front differential 28. Front drive axles 30 extend from the differential 28 to the front wheel assemblies 32. The front wheel assemblies 32 are arranged to be either coupled to the drive axles 30 or uncoupled from the drive axles 30 as will be later described and illustrated. The wheel assemblies 32 include steering knuckles 42 which are provided to facilitate steering the vehicle. The drive motor 12 includes an intake manifold 34 which provides a source of negative air pressure that is utilized in one embodiment of the invention to operate the pulse operated interlock mechanism of the present invention. A tank 38 is coupled to the intake manifold 34 via line 33 to provide an adequate supply of air to operate the pulse actuated interlock mechanism. A known control device 36 connected to the tank 38 via line 35 controls the magnitude of the negative air pressure and the flow of air to and from the pulse operated mechanism. Air lines 37 connected to the controller 36 and each knuckle 42 are provided for the air flow to and from the pulse operated mechanisms.

The vehicle is operable in either two-wheel drive mode or four-wheel drive mode. In two-wheel drive mode, only the rear wheels 22 are driven by the motor 12. In two-wheel drive mode the transfer case 24 is uncoupled. That is, it does not supply rotative power from the transmission 14 to the front drive shaft 26. Also, the front wheels 32 are uncoupled from the front axles 34 so that the front wheels 32 will not rotatively drive the front axles 30, the differential 28 and the front drive shaft 26 when the vehicle is in motion. To operate the vehicle in four-wheel drive mode, the transfer case 24 is shifted to its coupled position so that it will provide rotative power from the transmission 14 to the front drive shaft 26. The front drive shaft 26 in turn will drive the differential 28 and the front drive axles 30. The wheel assemblies 32 are also coupled to the front drive axles 30 so that the motive power of the engine 12 will be supplied to the front wheels 32 as well as the rear wheels 22.

The pulse operated interlock mechanism of the present invention is incorporated into the front wheel assemblies 32 to either couple a wheel hub to a drive axle 30 or to uncouple a wheel hub from the drive axle 30.

The front axles 30 are most often considered the drive or driving member and the wheel assembly 32 (including a wheel hub) is considered the driven member. This is the condition when the motor 12 supplies the motive force or power to drive the wheels 32. When the vehicle is in motion, the wheel assembly 32 (including a wheel hub) can become the drive member, i.e., when the wheel assembly 32 is coupled to the axle 30 and the transfer case is disengaged so that the wheels 32 in contact with the ground will rotate to drive (rotate) the axles 30, the gears in the differential 28, and the front drive shaft 26. This is an undesirable condition which causes energy loss and unnecessary wearing and is a major reason for disconnecting the front wheels from the axle in two-wheel drive.

Refer now to FIGS. 2A, 2B, 2C and 2D of the drawings which illustrate schematically the operation of the pulse actuated interlock mechanism of the present invention. Only those components necessary for an understanding of the operation are illustrated. As shown, an end 50 of the drive axle 30 is received within a wheel hub 58. Mounted on the end 50 of the axle 30 is a drive gear 52. A clutch ring 54, which in this embodiment is in full time engagement with the wheel hub 58, is slidably movable to be either in engagement with the drive gear 52 or out of engagement with the drive gear 52. When the clutch ring 54 is in engagement with the drive gear 52, the wheel hub 58 will be coupled to the drive axle 30 and when the clutch ring 54 is out of engagement with the drive gear 52, the wheel hub 58 will be out of engagement with the axle 30. A return spring 60 urges the clutch ring 54 out of engagement with the drive gear 52.

A housing 62 is mounted to the end of the wheel hub 58 and has a diaphragm 90 mounted in its end portion adjacent an end cap 92 fitted to the end of the housing 62. A piston assembly 70 has a primary piston 72 in abutment with the diaphragm 90 and has a secondary piston 74 in abutment with the clutch ring 54. An engagement spring 76 is captive between the primary piston 72 and the secondary piston 74. The engagement spring 76 urges the primary piston 72 and the secondary piston 74 to move axially away from each other. The primary piston 72 and the secondary piston 74 are arranged to be either latched together such that the spring 76 will not move the pistons 72, 74 away from each other or to be in an unlatched position so that the spring 76 may move the pistons 72, 74 axially away from each other. The piston assembly 70 is expandable by movement of the pistons 72, 74 away from each other and is contractible by movement of the pistons 72, 74 toward each other. Negative air pressure is applied to the cavity of the wheel hub 58 on the inner side of the diaphragm 90 to affect expansion and contraction of the piston assembly 70.

Figure 2A:
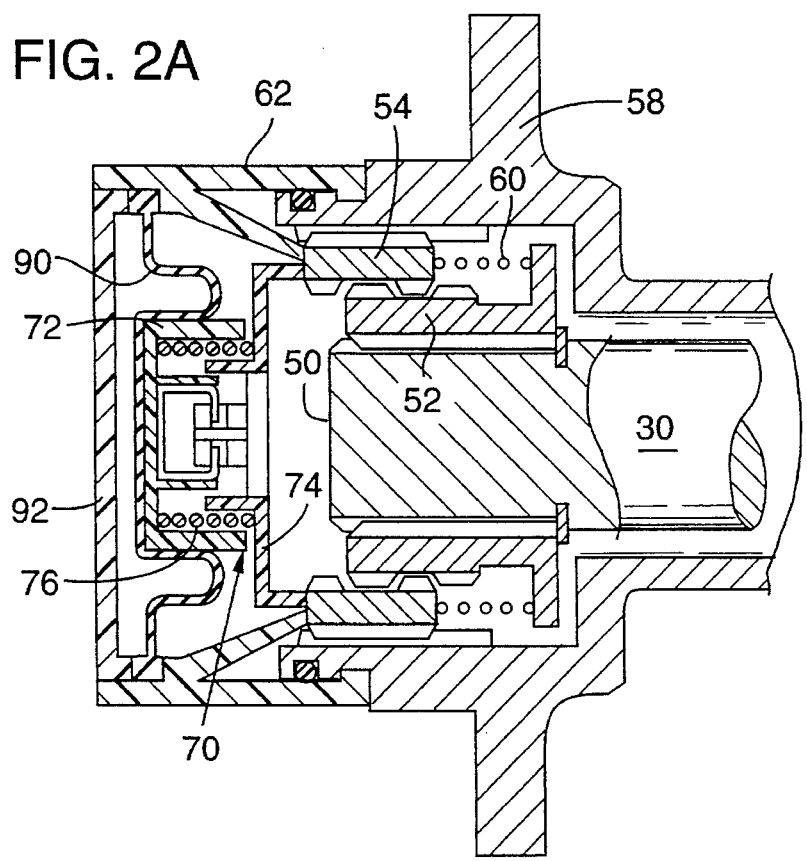

Consider first the condition where the primary piston 72 is latched to the secondary piston 74. (The latching mechanism will be later described in more detail.) The pistons 72, 74 have been moved axially toward each other to contract the piston assembly 70 and in the process the pistons 72, 74 are latched one to the other. The engaging spring 76 is restrained and compressed between the pistons 72, 74. This is as illustrated in FIG. 2A. The primary piston 72 which is latched to the secondary piston 74 does not permit the engagement spring 76 to expand the piston assembly 70 to thereby overpower the return spring 60. Therefore, the clutch ring 54 has been moved out of engagement with the drive gear 52 due to the urging of the return spring 60.

Figure 2B:
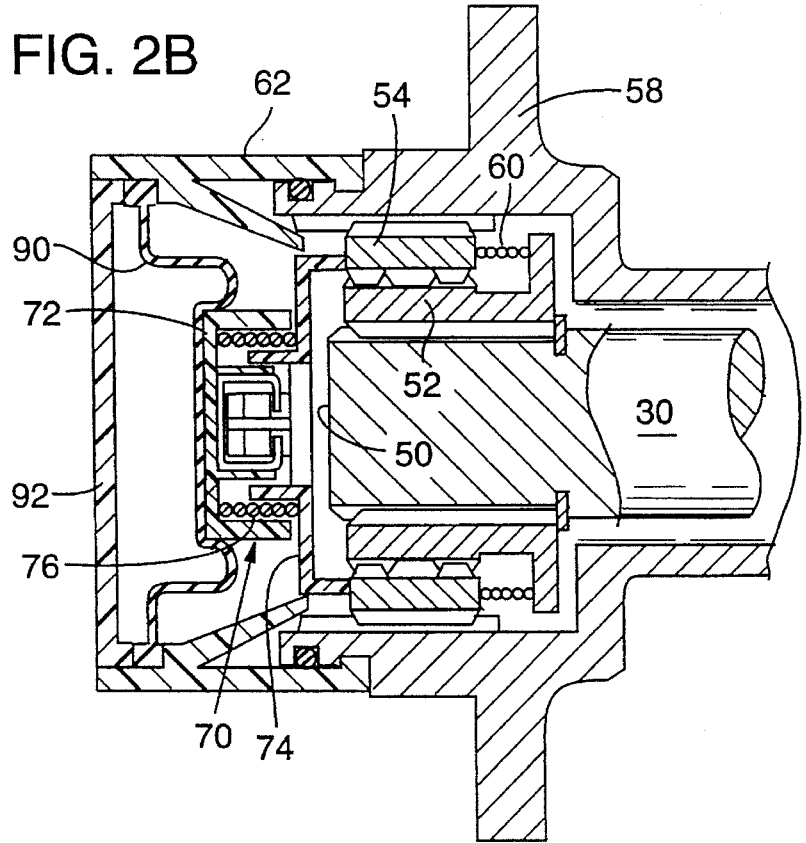

The unlatching of the pistons 72, 74 is accomplished by a further movement of the pistons 72, 74 toward each other which is accomplished by applying a negative air pressure of a second magnitude (which is greater than the first magnitude). The negative air pressure of the second magnitude acting on the diaphragm 90 will create a force to act against the piston assembly 70 to urge the piston assembly 70 toward the end 50 of the wheel axle 30. The piston assembly 70 is moved toward the end 50 of the axle 30 and the secondary piston 74 is restricted in its inward movement due to its abutment with the clutch ring 52. Piston 72 is thereby compressed against piston 74. This position is illustrated in FIG. 2B.

The negative air pressure of the second magnitude creates a compressive force sufficient to unlatch the primary piston 72 from the secondary piston 74. The negative air pressure of the second magnitude is released. That is, the air pressure within the hub 58 will be substantially the same as the ambient pressure outside of the hub 58. The engaging spring 76 is no longer constrained and will force the primary piston 72 and the diaphragm 90 outwardly against the end cap 92 and will continue to urge the secondary piston 74 inwardly against the clutch ring 54 and toward the end 50 of the axle 30. Such urging will produce engagement of the clutch ring 54 with the drive gear 52 upon alignment of the respective splines or gear teeth. The engaging spring 76 provides an urging force greater than the urging force of the spring 60 and therefore as the clutch ring 54 moves into engagement with the drive gear 52 the return spring 60 will be compressed. The wheel hub 58 is thus coupled to rotate with the drive axle 30. FIG. 2B shows the configuration while the second magnitude of force is being applied and FIG. 2C shows the configuration after the force has been released. The clutch ring 54 and drive gear 52 are shown coupled in both figures. However, this depends on the alignment of the respective splines of the clutch ring and drive gear. As soon as they are aligned engagement will occur but this can take place both during and after application of the force.

The clutch ring 54 is uncoupled from the drive axle 30 by applying a negative air pressure of the first magnitude to the cavity of the wheel hub 58 as shown in FIG. 2D. The application of the negative air pressure of the first magnitude will force the primary piston 72 toward the secondary piston 74 and in the process will compress the engaging spring 76. The primary piston 72 and the secondary piston 74 will become latched together, and the negative air pressure is once again released from the cavity of the wheel hub 58. The engaging spring 76 is now captively restrained and compressed between the primary piston 72 and the secondary piston 74. As the air pressure equalizes on each side of the diaphragm 90, the return spring 60 will urge the clutch ring 54 and the piston assembly 70 to move toward the end cap 92 and the clutch ring 54 will move out of engagement with the drive gear 52 and will be in the state as illustrated in FIG. 2A.

Figure 3:
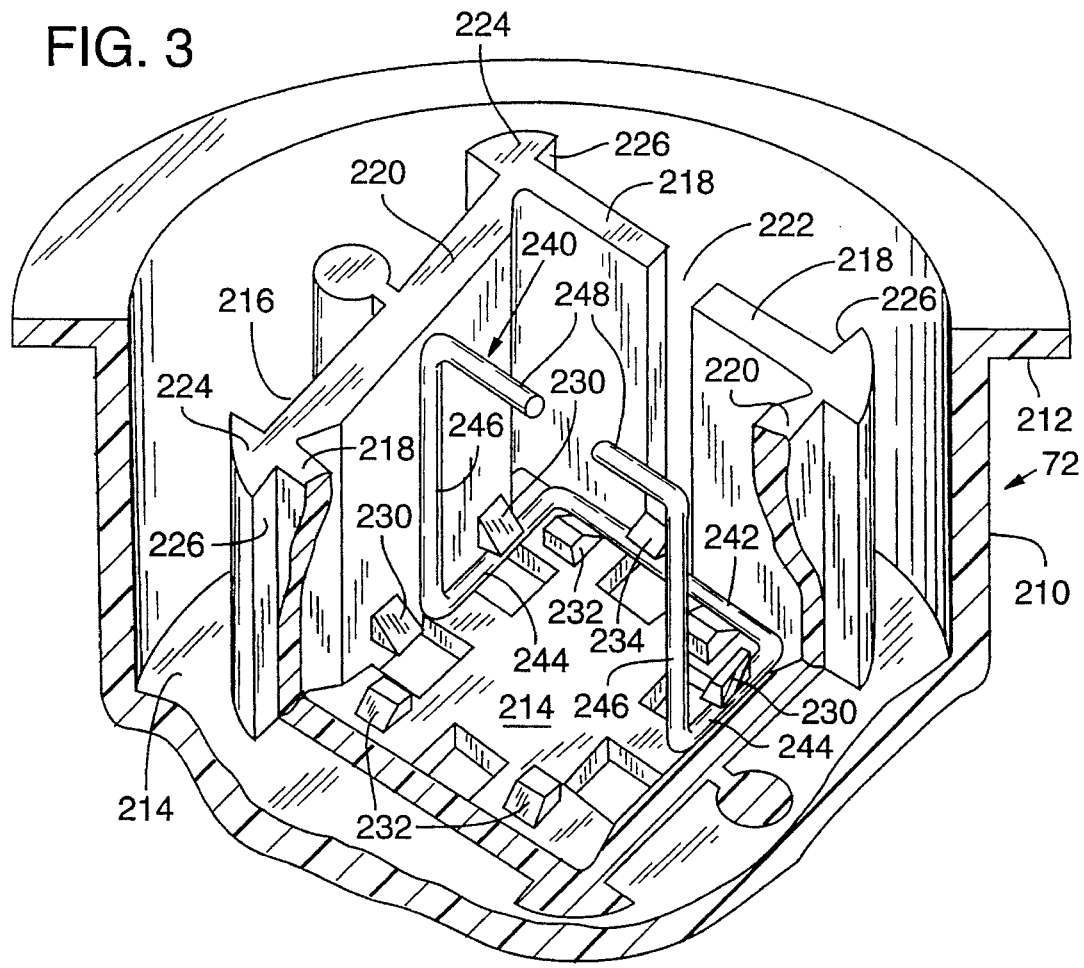
FIG. 3 is a perspective view of a primary piston of a pulse actuated interlock mechanism.

Refer now to FIG. 3 which illustrates the piston 72 in a cut away perspective view. The cylinder 72 has a cup portion 210 extending from a rim 212 and the cup 210 has a base portion designated as 214. A symmetrical rectangular chamber 216 extends from the base 214 within the cup 210. The chamber 216 has opposed upstanding walls 218 and opposed upstanding walls 220 with the walls 218 and 220 being joined at their ends to form corners. Each of the walls 218 has a slot 222 that extends downward from the top of the wall 218 to a boss 234 that is extended from the wall 218. Posts 224 are provided at the junctures of the walls 218 and 220 and the posts 224 have an edge 226 that extends normally from the upstanding wall 218 and which are provided to guide the secondary piston 74 as will be later explained and shown. Retaining bosses 230 extend from the wall 220 at a height above the base 214. Retaining bosses 232 extend from the base 214 and are positioned strategically to the upstanding wall 218. Retaining bosses 234 extend from the upstanding wall 218 substantially at the base of the slot 222 formed in the wall 218.

A latch spring 240 is received in the chamber 216 with a base portion 242 being received under the boss 234 and is retained against the upstanding wall 218 by the bosses 232 extending from the base 214. A foot portion 244 of the spring 240 is received under the boss 230 extending from the upstanding wall 220. The spring 240 which is symmetrical has a foot portion 244 positioned adjacent each of the upstanding walls 220. The spring 240 has, when it is mounted in position, a leg 246 extending upwardly from the base 214 with a leg portion 246 being adjacent each of the upstanding walls 220. An arm portion 248 of the spring 240 extends inwardly from the leg portion 246 toward the center of the chamber 216 and as shown the arms 248 are aligned one with the other and have their ends spaced at a distance from each other. As shown, the chamber 216 is of symmetrical construction such that the base portion 242 of the spring 240 may be placed against either of the upstanding walls 218.

Figure 4:
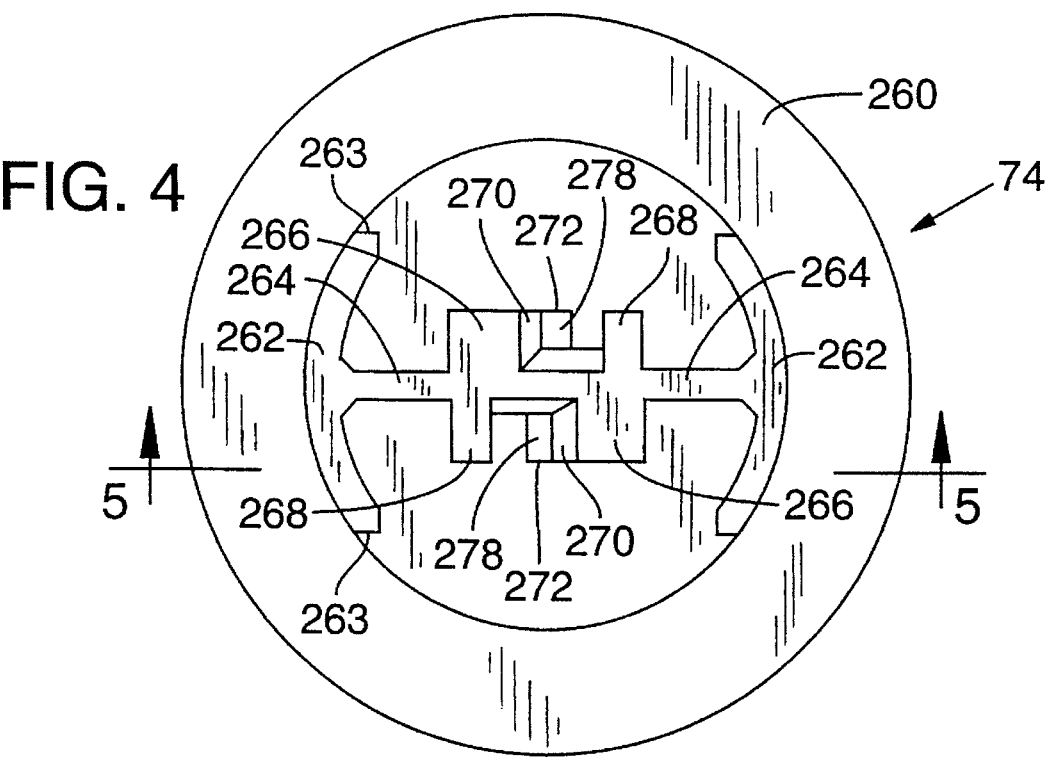
FIG. 4 is a view of a secondary piston of the pulse actuated interlock mechanism.
Figure 5:
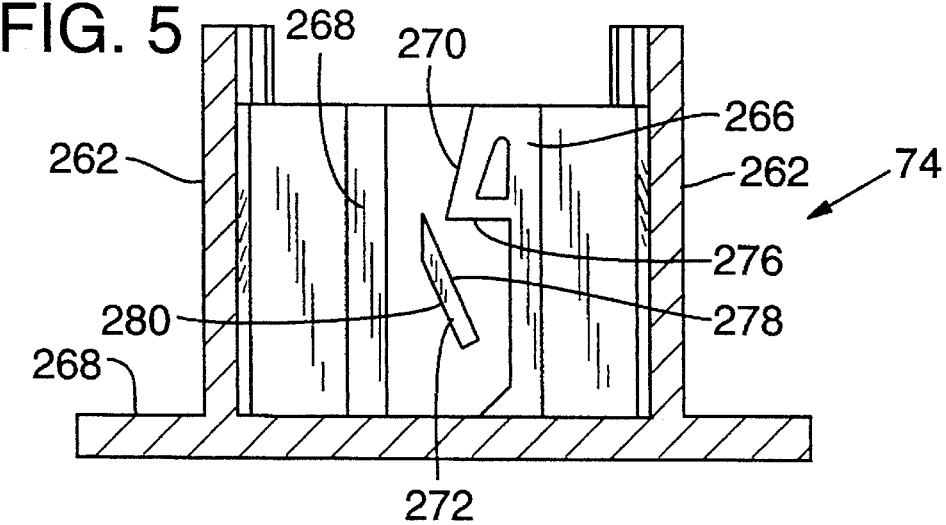
FIG. 5 is a view of the secondary piston of FIG. 4 as viewed on view lines 5—5.

The secondary piston 74 of the piston assembly 70 is illustrated in FIGS. 4 and 5. The piston 74 has a circular base 260 and has opposed curved walls 262 extending upwardly from the base 260. The upstanding walls 262 are symmetrically positioned relative to the center of the base 260. Each end of the walls 262 has substantially a squared end 263 that will reside in the corner of the primary piston 72 formed by the post edge 226 and the edge of the upstanding wall 218.

A center wall 264 extends upward from the base 260 and is joined to each of the upstanding walls 262. The upstanding wall 264 has a formed projection 266 extending from each side of the wall 264 with each of the projections 266 being symmetrically positioned relative to the center of the base 260. The center wall also has columns 268 extending from the wall 264 with the columns 268 again being symmetrically positioned relative to the center of the base 260. The upstanding wall 264 thus has a projection 266 and a column 268 on one side of the wall and another projection 266 and another column 268 on the other side of the wall. As shown in FIG. 4, the projection 266 and the column 268 extend substantially the same distance from the wall 264 and as seen in FIG. 5, the projection 266 and the column 268 on each side of the wall 264 are positioned at a distance one from the other.

Extending from the wall 264 between the projections 266 and 268 is a projecting boss 272. The projecting boss 272 extends from the wall 264 at a distance above the base 260 and is inclined at an angle relative to the column 268. As shown, the boss 272 does not extend to the top of the wall 264. The projection 266 has a surface 270 that is inclined at an angle to the base 260. The surface 270 extends downwardly from the top of the wall 264 to just below the upper portion of the inclined boss 272. The projection 266 has a face 276 that is substantially parallel to the base 260 and extends from the lower edge of the face 270. The extending boss 272 has an inclined surface 278 on one side and another inclined surface 280 on the opposite side of the boss 272.

Figure 6:
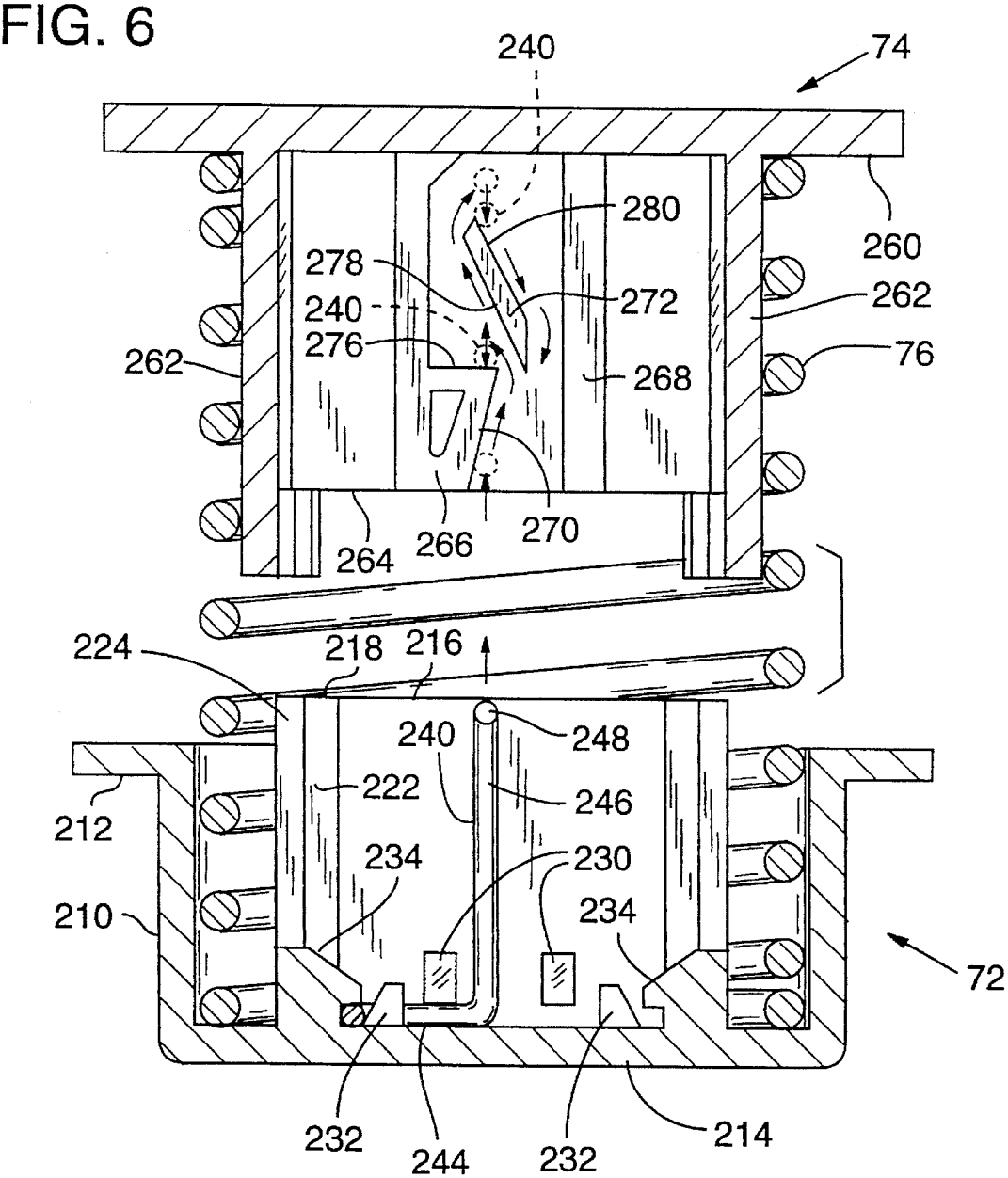
FIG. 6 is a sectional view of the primary piston of FIG. 3 and the secondary piston of FIGS. 4 and 5 and an engaging spring in combination forming a piston assembly.

The primary piston 72 and the secondary piston 74 of the piston assembly 70 are fitted together as illustrated in FIG. 6. The engaging spring 76 is fitted between the primary piston 72 and the secondary piston 74 with the spring 76 surrounding the formed chamber 216 of the primary piston 72 and in abutment with the base 214 and surrounding the upstanding walls 262 of the secondary piston 74 and in abutment with the base 260. The primary piston 72 and the secondary piston 74 are aligned such that the ends 263 (See FIG. 4) of the walls 262 of the secondary piston 74 will span the opposed walls 218 of the primary piston 72 and the ends 263 of the walls 262 will be received in the corners defined by the face 226 (See FIG. 3) of the post 224 and the edge of the wall 218. The upstanding wall 264 of the secondary piston 74 will be received in the slots 222 of the upstanding walls 218 of the primary piston 72.

As the pistons 72 and 74 are moved toward each other, the arms 248 of the latch spring 240 will come into contact with the face 270 of the projection 266. The face 270 will deflect the arm 248 of spring 240 to thus establish a biasing force which urges the arm 248 to return to its normal static state. The arm 248 will upon reaching the edge of the face 270 adjacent the land 276 will return to its normal central position. This will place the arm 248 in contact with the surface 276 and this is the position where the pistons 72, 74 are latched together. In the process of assembling the pistons 72, 74, that is moving them toward each other, the engaging spring 76 will be compressed. The engaging spring 76 in its compressed state, of course, will urge the pistons 72, 74 to move apart. The arm 248 of the latch spring 240 being against the land 276 will prevent the pistons 72, 74 from moving axially apart. As previously mentioned, a force of a first magnitude urging the pistons 72, 74 to move axially toward each other is applied to establish the latching of the pistons 72, 74. That is, the force is sufficient to compress spring 76 to the point where spring portion 248 will extend past land 276 but not sufficient to cause unlatching as will be explained.

The pistons 72, 74 are unlatched one from the other my moving the pistons further toward each other by applying a force of the second magnitude. As the pistons move toward each other further, the arm 248 of the latch spring 240 will come into contact with the surface 278 of the boss 272 and thus urge the arm 248 of the spring to follow the inclined surface 278 and thus deflect the arm 248 of the spring 240. This again will establish a biasing force which urges the arm 248 back to its static state. As the pistons 72, 74 are moved closer together, the arm 248 of the spring 240 will travel past the end of the boss 272 and the arm 248 of the spring will pivot back to its central position due to its natural biasing force. Upon release of the force that urges the pistons 72, 74 to move axially toward each other, the compressed spring 76 will urge the pistons 72, 74 to move axially apart from each other. The arm 248 of the spring 240 will travel along the inclined face 280 of the boss 272 and will upon reaching the end of the boss 272 return to its static position. As shown, the boss 272 is strategically positioned such that as the arm 248 travels beyond the boss 272, the arm 248 of the spring 240 will move against the face 270 of the projection 276. Since the arm 248 does not come into contact with the land 276, the pistons 72,. 74 are in the unlatched position and will be urged to move axially apart by the compressed spring 76.

The housing 62 which was schematically illustrated and briefly described with reference to FIGS. 2A–2D, is illustrated in detail in the perspective view of FIG. 7 and the cutaway view of FIG. 8. The housing 62 is preferably of molded construction and of a high strength highly resilient material such as plastic. The housing 62 is a cylindrically shaped member that has a cylindrical base 120. Multiple upstanding turret-like projections 122 extend axially from the base 120. As shown in FIG. 7, the turrets 122 are equally spaced about the base 120 and are separated by a space designated as 124. Each of the turrets 122 have an opening (window) 126. The window 126 is provided to facilitate inserting a removal tool which will be later described and illustrated. A slot 128 is provided on the interior portion of each turret 122 with the slot 128 being above the window opening 126 and being substantially centered in reference to the window opening 126. The slot 128 thus extends from the top of the turret 122 down to the window opening 126. Frusto pyramid-like shaped tabs 130 extend radially inward on each side of the slot 128 and has a lower triangular surface 132 extending radially inward from the turret 122 at the top of the window 126, that is, the bottom surface 132 is substantially normal to the surface of the turret 122 and the longitudinal axis of the housing 62. A top triangular surface 134 of the tab 130 is at an angle to the lower portion 132. The top surface 134 is thus inclined at an angle with respect to the inner surface of the turret 122.

Multiple columns 140 (best seen in FIG. 8) extend from a rim 142 on the interior of the base portion 120 and as shown the columns 140 extend beyond the top of the turrets 122. A lower portion 144 of the columns 140 extend radially inward at an angle to the base portion 120. The upper portion 146 of the columns 140 are substantially parallel to the center axis of the base portion 120 of the housing 62. A cylindrical bearing block 150 is supported on the upper end of the columns 140. As shown, the bearing block 150 is a cylindrical member that has an extending rim 152 that is joined to the columns 140. A lower portion 154 of the bearing block 150 is thus at a spaced distance from the columns 140. Legs 170 as best seen in FIG. 8 also extend from the rim 142 of the base portion 120 of the housing 62. The legs 170 are inclined at substantially the same angle as the lower portion 144 of the columns 140. As shown, a leg 170 is positioned substantially centrally between adjacent columns 140.

Figure 9:
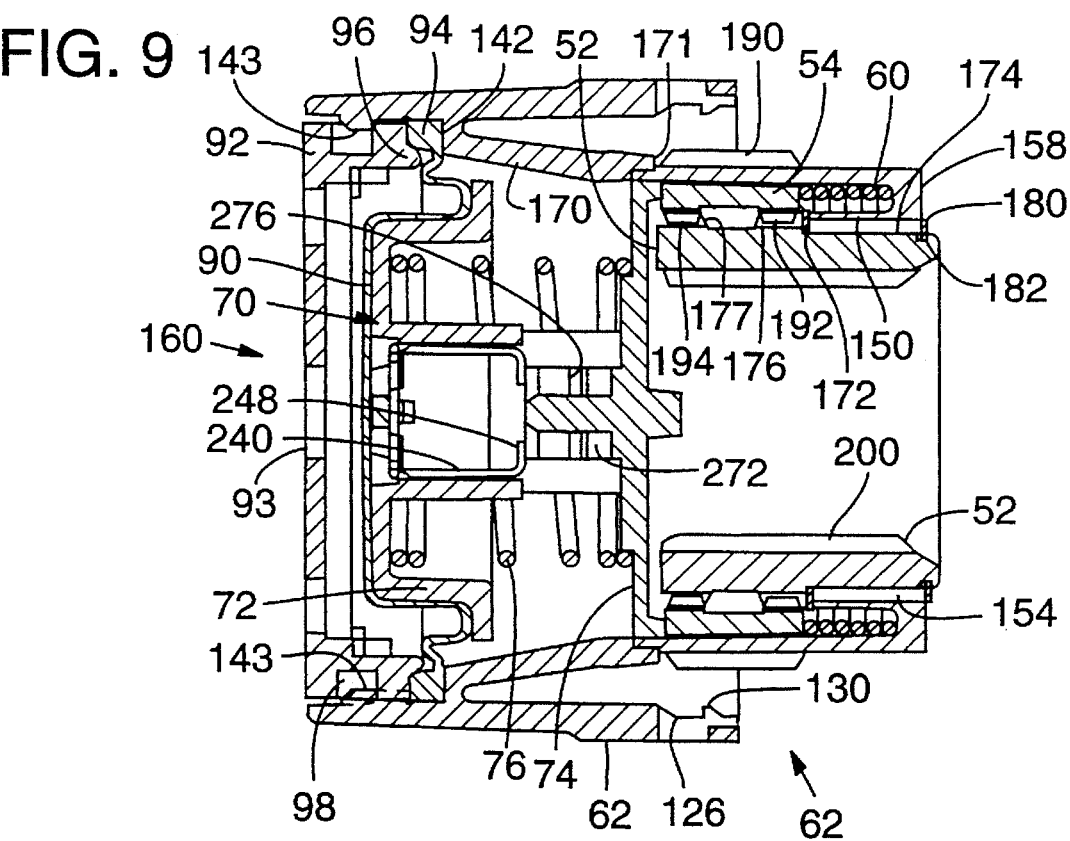
FIG. 9 is a sectional view of the housing of FIG. 7 showing components of the pulse actuated interlock mechanism mounted thereto.

Refer now to FIG. 9 of the drawings which illustrate in sectional view the housing 62 with the inner drive gear 52, the return spring 60, clutch ring 54, the piston assembly 70, the diaphragm 90 and an end cap 92 installed in the housing 62.

A wear washer 172 is installed on the inner drive gear 52 with the washer surrounding a bearing surface 174 and positioned adjacent the gear teeth 176. The inner drive gear 52 is inserted through the end 160 of the housing 62 with the bearing surface 174 of the gear 52 being received in the bearing block 150. The washer 172 will be in abutment with the bottom of the lower portion 154 of the bearing block 150. A retention ring 180 is installed in a groove 182 provided in the bearing surface 174 of the gear 52 to thus retain the gear 52 in the bearing block 150. The retaining ring 180 abuts the upper surface 158 of the bearing block 150. A return spring 60 is installed through end 160 of the housing 62 with the spring 60 surrounding the lower portion 154 of the bearing block 150 and being in abutment with the rim 52 of the bearing block 150.

The clutch ring 54 is then installed into the housing 62 through end 160 with the columns 140 being received in the valleys between the outer teeth 190 of the clutch ring 54. As the clutch ring 54 is installed in the housing 62, the resilient projecting legs 170 are forced to deflect outwardly until the clutch ring moves past the legs 170. As the clutch ring 54 is inserted into the housing 62, the inward projecting teeth 192 and 194 are aligned with the valleys between the teeth 177 and 176 of the inner drive gear 52. The clutch ring 54 will come into abutment with the return spring 60 to compress the spring 60 slightly. The clutch ring 54 is moved a sufficient distance to permit the legs 170 to move radially inward to their static state. The ends 171 of the legs 170 thus become a positive stop for the clutch ring 54 and will limit movement of the clutch ring 54 due to the urging of the return spring 60.

The piston assembly 70, preferably in its latched condition, is then installed in the lower end 160 of the housing 62 with the secondary piston 74 in abutment with the clutch ring 54. The diaphragm 90 is then installed in the end 160 of the housing 62 with a peripheral edge 94 of the diaphragm 90 in abutment with the underside of the rim 142. As shown, the diaphragm 90 surrounds the cup portion 210 of the primary piston 72.

An end cap 92 is fitted to the lower end 160 of the housing 62. The end cap 92 is arranged to entrap the peripheral edge 94 of the diaphragm 90 between the rim 142 of the housing 62 and a formed projection 96 on the end cap 92. The end cap 92 is retained on the end 160 of the housing 62 by inwardly projecting stops 143 on the housing 62 that engage a peripheral bayonet-like slot 98 in the end cap 92. The end cap 92 is provided with an aperture fitted with a filter designated as 93 to provide free flow of air into and out of the cavity between the end cap 92 and the diaphragm 90.

The assembly of the components in the housing 62 provides a ready module that is simply attached to a wheel hub 58. The inner drive gear 52 is rotatably supported in the bearing block 150 of the housing 62. The clutch ring 54 is captively held between the top 171 of the legs 170 and the spring 60. It will be appreciated that the spring 60 is yieldable and thus the clutch ring 54 is axially slidably movable away from and toward the inner end of the extending legs 170 of the housing 62. The piston assembly 70 is simply inserted into the end 160 of the housing 162 and requires no rotational orientation or other securement other than the installation of the diaphragm 90 and the end cap 92. In actual practice the piston assembly 70, the diaphragm 90 and the end cap 92 are fitted to the housing 62 after the housing 62 has been installed on the end of the wheel hub 58. This is to facilitate installing the housing 62 on the hub 58 by aligning the internal teeth 200 of the drive gear 52 with the gear teeth 31 on the end 50 of the axle 30 and to align the teeth 190 of the clutch ring with the gear teeth (splines) 59 of the hub 58 and to align the gear teeth 192, 194 with the gear teeth 177, 176 of the drive gear 52.

The housing 62 with the clutch ring 54, return spring 60 and the drive gear 52 installed therein is readily mounted on the end of the hub 58 by simply forcing the housing 62 onto the end of the hub 58. The inclined surface 134 of the projecting tabs 130 will force the turrets 122 (See FIG. 8) outwardly as the inclined surface 134 (See FIG. 8) of the tab 130 engages the inclined plane 57 of the wheel hub 58 (see FIGS. 10 and 11). The housing 62 is moved onto the end of the wheel hub 58 until the tabs 130 snap into the groove 53 of the wheel hub 58. The base portion 132 of the tab 130 fits squarely in the groove 153 and thus securely retains the housing 62 onto the wheel hub 58. Removal is prevented by mounting of a wheel to the wheel hub 58. In FIG. 11, a flange portion W of a wheel is illustrated in dash line to overly the tab 130 and prevent outward flexing of the tab. The wheel has to be first removed to remove the housing.

Figure 12:
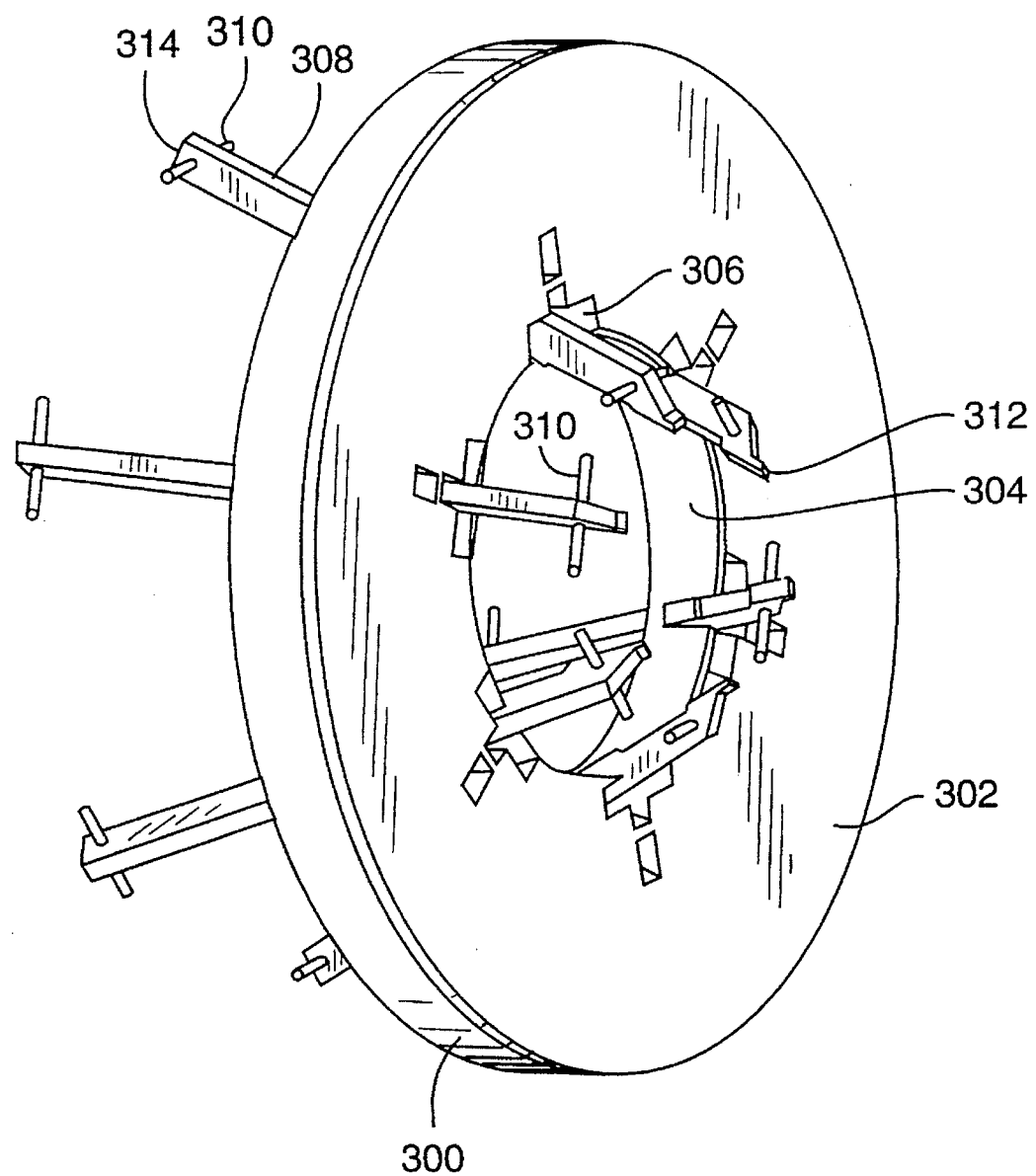
FIG. 12 is a perspective view of a housing removal tool.

A housing removal tool 300 illustrated in FIG. 12 is utilized to remove the housing 62 from the end of the wheel hub 58. The turrets 122 of the housings 62 must be moved outwardly to disengage the projection tabs 130 from the groove 53 of the wheel hub 58.

The tool 300 has a circular disk 302 that has a center opening 304. The center opening 304 is sufficiently large to encircle the housing 62. Formed through-slots 306 are provided around the periphery of the opening 304 with the slots 306 being equal to the number of turrets 122 on the housing 62. Slidably mounted in the slots 306 are elongate arms 308. The slots 306 are formed such that the arms 308 received in the slots may be pivoted relative to the base portion 302. Pins 310 extend through each end of the arms 308 to prevent the arms 308 from sliding out of the slots 306. The arms 308 have a formed tip 312 that is configured to be passable through the window 126 of the turret 122 and engage the slot 128 of the turret 122 (See FIG. 7).

Figure 13:
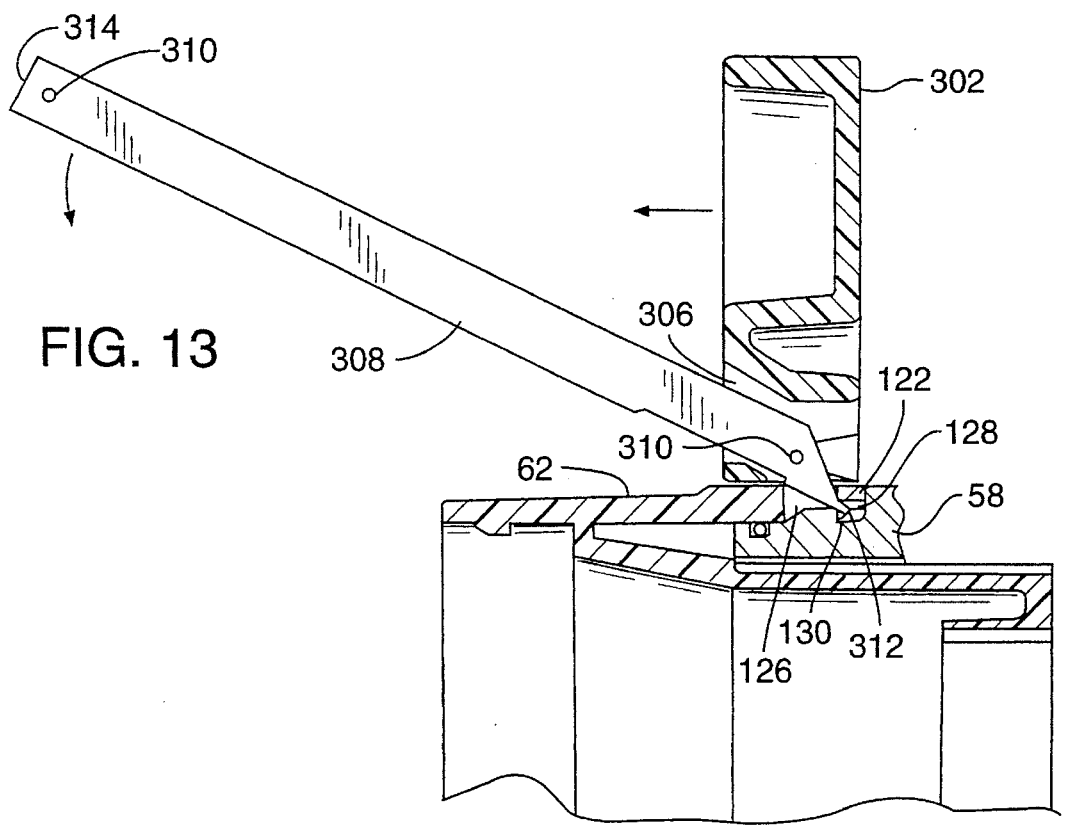
FIGS. 13 and 14 illustrate the use of the tool of FIG. 12.
Figure 14:
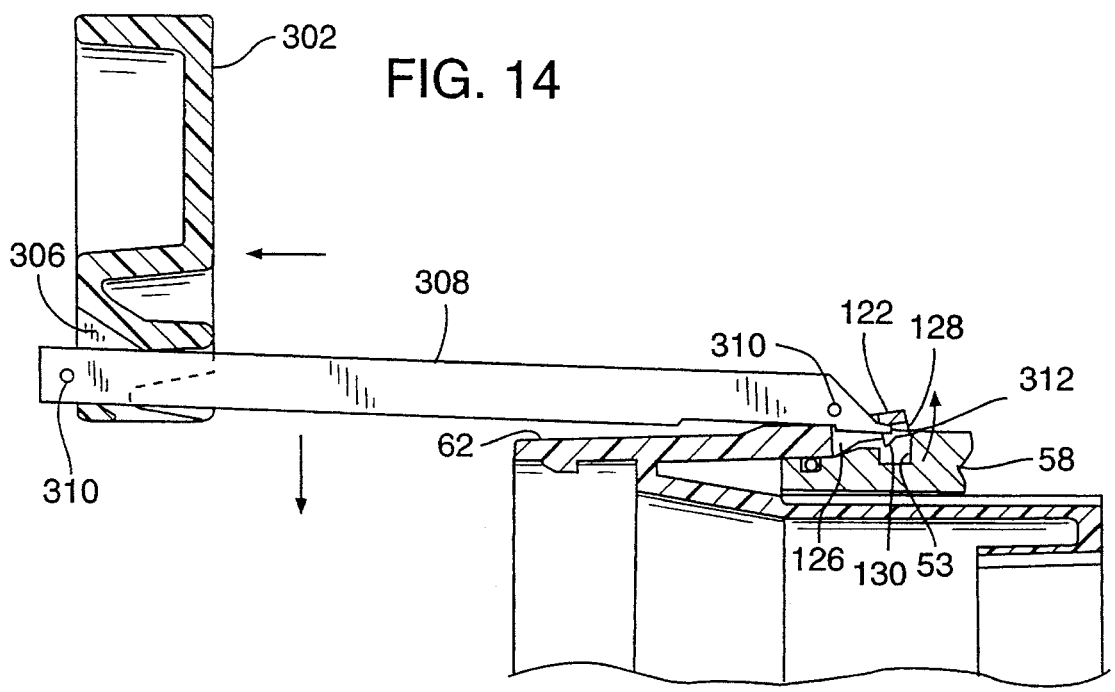

The housing 62 is removed by use of the tool 300. All of the arms 308 are retracted such that the formed tip 312 is received in the configured slot 306 and does not extend into the opening 304. The ring portion 302 is then fitted on the end of the housing 62 and the tips 312 of each arm 308 are inserted through the window 126 of a corresponding turret 122 with the tip 312 engaging the slot 128 of the turret 122. This is as illustrated in FIG. 13. As shown, the tip 312 is inserted through the window 126 and is in engagement with the slot 128 of the housing 162. The ring portion 302 is then moved axially toward the cap end of the housing 62 and the extending ends 314 of the arms 308. As the ring 302 is moved in this direction, the end 314 of the arm 308 will be urged to pivot toward the center line of the housing 62 which will urge the turrets 122 to move radially outward to disengage the tabs 130 from the groove 53 of the wheel hub 58 as shown in FIG. 14. When the tabs 130 are clear of the groove 53, the housing 62 is simply pulled off the end of the wheel hub 58.

Figure 10:
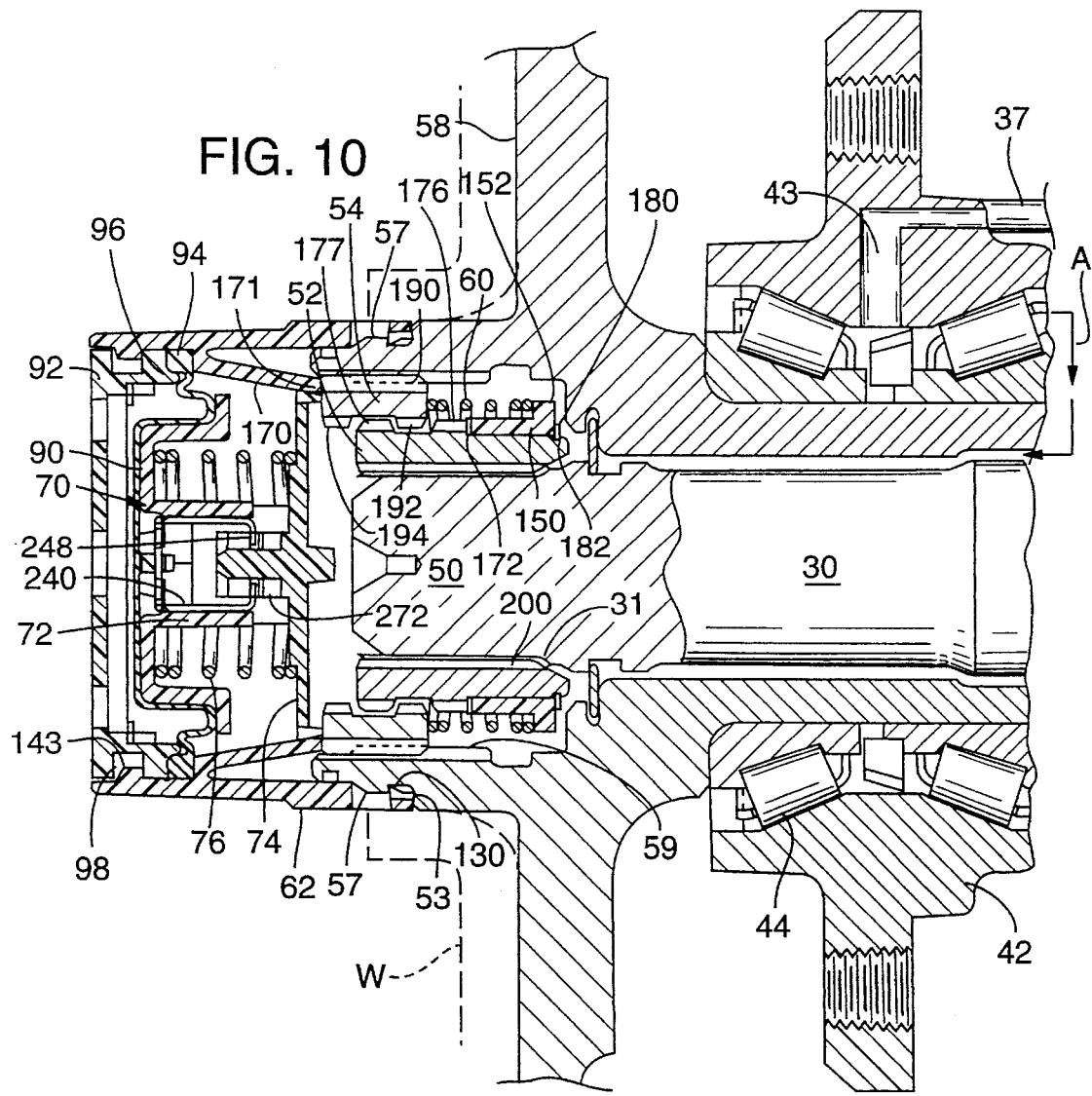
FIG. 10 is a sectional view illustrating the housing of FIG. 9 mounted to a wheel hub and showing the arrangement of the pulse actuated interlock mechanism for un-coupling the wheel hub from a drive axle.
Figure 11:
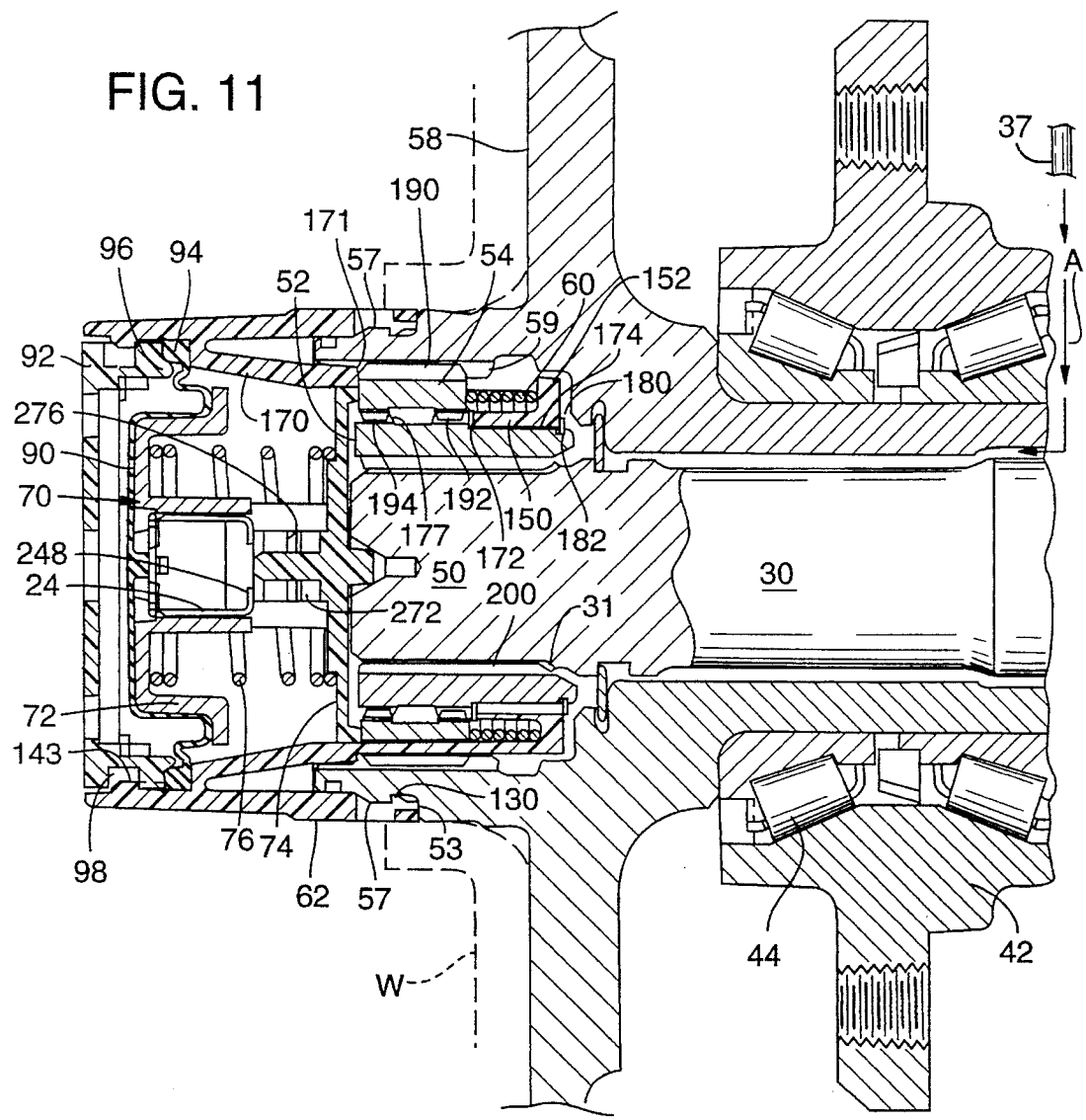
FIG. 11 is a sectional view similar to FIG. 10 showing the arrangement of the pulse actuated interlock mechanism for coupling the wheel hub to a drive axle.

FIGS. 10 and 11 illustrate the pulse operated clutch mechanism of the present invention mounted to a wheel hub 58. The wheel hub here is illustrated to be an integral component including a live spindle and reference to wheel hub 58 encompasses, but is not limited to, the live spindle. The wheel hub 58 is in turn mounted to the knuckle 42 on bearings 44. The knuckle 42 has a port located behind the bearings 44 (not shown) that extends from the interior of the knuckle 42 and is coupled to the air line 37 which is in turn connected to the controller 36. The port extends into the interior of the hub 42 in a known manner behind the wheel hub 58 as indicated by arrows A, and thus provides a path for air to flow into and out of the cavity of the knuckle 42 and thus the wheel hub 58 and the housing 62 mounted on the wheel hub 58. Known seals are provided to seal the cavity defined by the knuckle 43, the wheel hub 58 and the housing 62 to provide a substantially air tight enclosure.

The housing assembly 62 is mounted on the end of the wheel hub 58 with the tabs 130 of the housing 62 being received in a peripheral groove 53 of the wheel hub 58. As shown and as previously described, the inner drive gear 52 is rotatably supported in the bearing block 150 of the housing 62. The inner teeth 200 of the drive gear 52 mesh with the formed teeth 31 on the end 50 of the axle 30. The clutch ring 54 has its peripheral teeth 190 engaged with the teeth 59 formed on the interior portion of the wheel hub 58. The clutch ring 54 is slidably movable in the wheel hub 58 to be in engagement with the drive gear 52 which couples the hub 58 to the drive axle 30 or to be out of engagement with the drive gear 52 which un-couples the wheel hub 58 from the drive axle 30.

FIG. 10 illustrates the condition where the clutch ring 54 is out of engagement with the drive gear 52. That is, the teeth 194 on the clutch ring 54 do not engage the teeth 177 on the drive gear and the teeth 192 on the clutch ring 54 do not engage the teeth 176 on the drive gear 52. The piston assembly 70 is in a latched (contracted) condition, that is, the primary piston 72 and the secondary piston 74 are latched together by the latch spring 240. The engaging spring 76 is thus captively restrained and compressed between the primary piston 72 and the secondary piston 74. The return spring 60 thus urges the clutch ring 54 to move against the top 171 of the leg 170 and urges the piston assembly 70 and the diaphragm 90 toward the end cap 92.

As previously mentioned, a force of a first magnitude is applied to the piston assembly 70 to effect the latching of the primary piston 72 to the secondary piston 74. In this embodiment, negative air pressure of the first magnitude is applied to the cavity of the wheel hub 58 and the differential air pressure acting on the diaphragm 90 will urge the piston assembly 70 to move toward the end 50 of the axle 30. The applied force of the first magnitude is sufficient only to compress the engaging spring 76 adequately to permit the arm 248 of the latch spring 240 to be moved to the position where it engages the land 276 (See FIG. 9) on the secondary piston 74. When the pressure of the first magnitude is released, the engaging spring 76 will urge the pistons 72, 74 to move apart. However, this movement is limited by the arm 248 of the latch spring 240 being in engagement with the land 276 (See FIG. 9) of the secondary piston 74.

The clutch ring 54 is moved from the disengaged position as shown in FIG. 10 to the engaged position as shown in FIG. 11 by applying a force of a second magnitude (a negative air pressure of a higher magnitude than the first level) to the cavity of the wheel hub 58. The differential air pressure acting on the diaphragm 90 will urge the piston assembly 70 toward the end 50 of the axle 30 and thus will urge the primary piston 72 to move toward the secondary piston 74. The secondary piston 74 being in contact with the clutch ring 54 will urge the clutch ring 54 to move axially against the return spring 60 and thus move the clutch ring 54 into engagement with the drive gear 52. The force of the second magnitude will continue to move the primary piston 72 toward the secondary piston 74 and thus will move the arm 248 of the latch spring 240 past the boss 272 of the secondary piston 74 and in the process will compress the engaging spring 76 further. The force of the second magnitude is then released and the pressure within the wheel hub 58 is equalized with the ambient air pressure. The compressed engaging spring 76, since the pistons 72, 74 are no longer latched, will urge the pistons 72, 74 to move axially apart and in the process will urge the primary piston 72 and the diaphragm 90 toward the end cap 92. The secondary piston 74 will, due to the force exerted by the engaging spring 76, maintain the clutch ring 54 in engagement with the drive gear 52.

Figure 15:
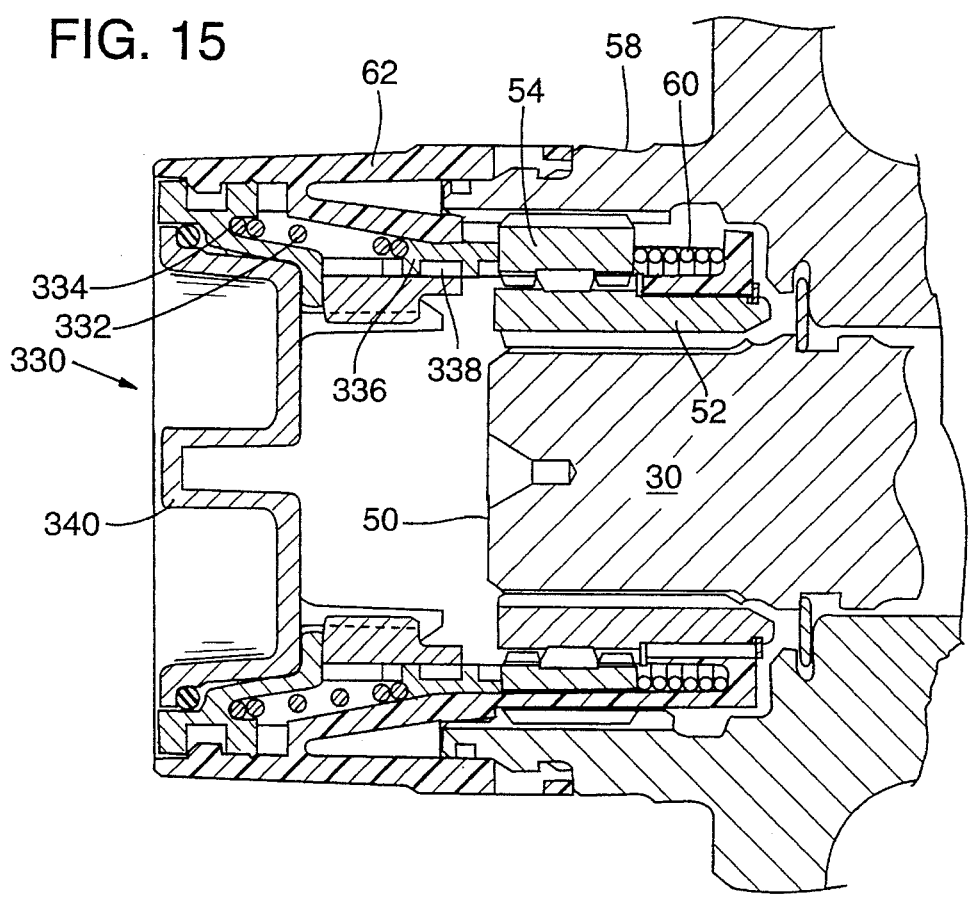
FIG. 15 illustrates a manually operated interlock mechanism.

The housing 62 by its unique arrangement is also utilized with a manually actuated interlock mechanism as illustrated in FIG. 15. As shown in FIG. 15, the housing 62 is mounted on the end of the wheel hub 58 as previously described. A clutch ring 54, a return spring 60 and a drive gear 52 are mounted in the housing 62 as previously described and illustrated. The end cap 92, the diaphragm 90 and the piston assembly 70 is replaced by a manually operated mechanism and end cap assembly 330. The end cap assembly 330 is retained on the housing 62 in the same manner that the cap 92 is retained on the housing 62. The end cap assembly 330 includes an engaging spring 332 that is captive between a pocket 334 of the end cap assembly 330 and a movable slide member 336. The slide member 336 is in engagement with a cam member 338 that is coupled to a rotatable engaging knob 340. The slide member 336 is urged against the helical-like cam member 338 by the spring 332. When the knob 340 is rotated in one direction, the cam member 338 is rotated permitting the slide member 336 to move axially against the clutch ring 54 to thus urge the clutch ring 54 to move into engagement with the drive gear 52. The slide member 336 is urged against the cam member 338 by the engaging spring 332 and, therefore, should the clutch ring 54 be out of alignment with the drive gear 52, the cam member 338 will simply move away from the slide member 336. When the clutch ring 54 and the drive gear 52 are rotated relative to each other such that alignment occurs, the engaging spring 332 will (acting on the slide member 336) force the clutch ring 54 into engagement with the drive gear 52. The engaging spring 332 has a force that is greater than the return spring 60 and thus will urge the clutch ring 54 into engagement with the drive gear 52 and in the process will compress spring 342.

The clutch ring 54 is moved out of engagement with the drive gear 52 by rotating the knob 340 in the opposite direction. The rotation of the knob 340 in the opposite direction will cause the helical cam 338 to force the slide member 336 away from the end 50 of the axle 30 and will compress the engaging spring 332. The return spring 60 will urge the clutch ring 54 out of engagement with the drive gear 52.

Figure 16:
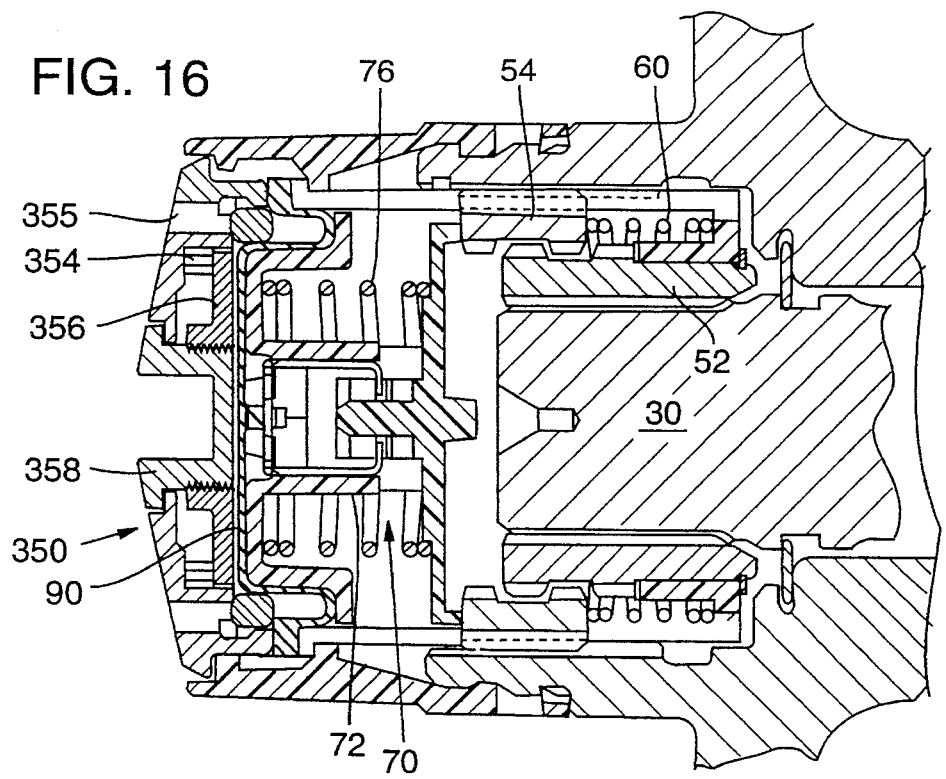
FIG. 16 illustrates the pulse actuated interlock mechanism of FIGS. 10 and 11 fitted with a manual dis-engaging feature.

The housing 62 that is equipped with the pulse actuated interlock mechanism previously described and illustrated may also be provided with a manual override latching device as shown in FIG. 16. The end cap 92 is replaced by an end cap assembly 350 which is arranged to move the diaphragm 90 and primary piston 72 toward the secondary piston 74. The end cap assembly 350 has a cam follower 356 that is thereby engaged with a rotatable knob 358. The cam follower 356 is spline fit at 354 to prevent rotation of the follower 356 with rotation of the knob. Rotation of the knob 358 will move the cam 356 axially toward the axle 30 and in the process will move the primary piston 72 toward the secondary piston 74. This action will compress spring 76 against the secondary piston 74 and thereby urge the clutch ring 54 into engagement with the drive gear 52. The knob 358 is rotated in the opposite direction to retract the cam follower 356 thus permitting the return spring 60 to urge the clutch ring 54 out of engagement with the drive gear 52 and to move the piston assembly 70 and the diaphragm 90 toward the end cap 350.

The end cap assembly including cam actuation is but one of a number of ways to effect manual movement of the piston assembly 70. Typically the assembly has a rotatable dial and a mechanism that converts rotative movement to axial movement as, for example, turning a screw to effect movement of a nut (a form of cam actuation and cam follower).

All of the above disclosures are but examples of how the invention or inventions may be implemented. The invention(s) is defined in the claims appended hereto which are to be broadly interpreted to encompass the full scope and meaning of the terms and limitations as used in the claims.

We claim:

1. In a device including a drive member and a driven member a pulse actuated interlocking mechanism for releasably interlocking the drive member and driven member comprising:

a clutch member between the drive and driven members and slidable between first and second positions, said clutch member in the first position engaged with one of the drive and driven members and the clutch member in the second position engaged with both of the drive and driven members;

a first biasing member continuously urging the clutch member to one of the first and second positions;

a piston assembly selectively urging the clutch member to the other of the first and second positions, said piston assembly including first and second pistons, a second biasing member urging and second pistons apart to an expanded condition and a latch mechanism for latching the first and second pistons together in a contracted condition and thereby constraining the second biasing member, said latch mechanism responsive to first and second compressive forces compressing said pistons together for latching and unlatching said latch member mechanism; and said piston assembly arranged relative to said clutch member whereby the expanded condition of the piston assembly urges the clutch member to the other of the first and second positions and whereby the contracted condition allows the first biasing member to urge the clutch member to said one of the first and second positions.

2. A pulse actuated interlocking mechanism as defined in claim 1 including a housing enclosing the interlock mechanism and defining a cavity, a diaphragm movably mounted in the housing and providing a wall of the cavity, said piston assembly positioned between said diaphragm and said clutch member; and an air source connected to the said cavity and a control for controlling the air source and thereby the air pressure in said cavity, said diaphragm in response to the change of air pressure in the cavity being movable toward the piston assembly to provide said first and second compressive forces.

3. A pulse actuated interlocking mechanism as defined in claim 2 wherein the first and second pistons each are provided with a component of said latch mechanism, the components provided with mated guideways that insure aligned axial relative movement of the pistons, one of the components provided with a spring finger and the other component provided with first, second and third angled guide surfaces and a land surface intermediate the first and second guide surfaces, said spring finger from a starting position being deflected by said first guide surface and onto the land surface in response to compression of the piston assembly by the first force level, and said spring finger deflected by said second guide surface and onto the third guide surface in response to compression of the piston assembly by the second force level, and said spring finger deflected by said third guide surface and back to its starting point in response to expansion of the piston assembly by said second biasing member.

4. A hub lock for a vehicle including a cylindrical wheel hub having an exterior peripheral groove, said hub lock comprising:

a hub lock housing having a cylindrical wall portion with a central axis mountable on such wheel hub, said housing enclosing a hub lock mechanism, a plurality of turret members extended axially of the housing, said turret members separated by slots and independently flexible radially outward from the cylindrical wall portion, tabs on the extended inner end of the turret member, said tabs configured to nest in the peripheral groove on such wheel hub whereby the hub lock housing can be press fit onto the wheel hub with the turret members flexed over the wheel hub, said tabs entering the groove and securing the housing to the wheel hub.

5. A hub lock for a vehicle as defined in claim 4 wherein the groove on the wheel hub and the tabs of the turrets when fitted to the groove underlie a wheel when mounted on the wheel hub, said wheel preventing lifting of the tabs from the groove to prevent removal of the housing.

6. A hub lock for a vehicle as defined in claim 4 wherein the hub lock mechanism includes a drive gear and clutch ring and said housing includes multiple leg portions formed on the cylindrical wall portion and extended inwardly and axially of said wall portion to define an inner end, said leg portion supporting on its inner end a bearing block, said bearing block configured to support said drive gear and clutch ring to enable pre-assembly of the hub lock mechanism to the housing.

7. A hub lock for a vehicle as defined in claim 6 wherein said drive gear is rotatable and axially fixed relative to said bearing block and said clutch ring is rotatably fixed and axially slidable relative to said bearing block, and a further plurality of leg portions formed on the cylindrical wall portion and extended inwardly and axially of said wall portion to define an inner stop position for limiting the outward slidable movement of said clutch ring.

8. A hub lock for a vehicle as defined in claim 6 wherein a groove on the wheel hub and the tabs of the turrets fitted to the groove underlie a wheel when mounted on the wheel hub, said wheel preventing lifting of the tabs from the groove to prevent removal of the housing, and said turrets configured to provide a space at an edge portion at an underside of the turrets to enable a prying tool to fit under the turrets to pry the tabs of the turrets out of the groove and permit removal of the housing from the wheel hub with the wheel removed therefrom.

9. A prying tool for removing a housing for a hub lock as defined in claim 8 from a wheel hub, said tool comprising:

a disk having a center opening sized and adapted to fit about such housing, slots formed through the disk providing guide openings positioned around the disk and adapted to be positioned in alignment with each of the turrets of the housing, elongate bar members each having an inner end portion and an outer end portion, with a configured nose at its inner end portion, and said inner end portions slidably inserted at an inward angle through the guide openings, said bar noses configured and adapted to fit into the spaces at the under side of each turret, and said disk and bars configured to allow sliding movement of the disk longitudinally of the bars and upon movement of the disk toward the outer ends of the bars thereby simultaneously to produce inward deflection of the outer ends of the bars for inducing prying movement of the noses thereof to flex the turrets radially outwardly and in the process remove the tabs from the groove and then remove the housing from the wheel hub.

10. A pulse actuated interlocking mechanism for locking and unlocking a hub lock of a vehicle comprising:

a piston assembly including primary and secondary pistons, a latch mechanism and a spring;

said spring positioned between said primary and secondary pistons and urging the pistons apart;

said latch mechanism including mated latch couplings provided on said pistons for automatic latching of said pistons when compressed together under a first force level opposing said spring and unlatching when compressed together under a second force level opposing said spring, said unlatching allowing the spring to separate said pistons;

a housing, a clutch member of a hub lock positioned in the housing, said piston assembly strategically positioned relative to said clutch member in said housing to produce selected movement of said clutch member, and means for generating said first and second forces whereby latching and unlatching of said piston assembly urges movement of the clutch member for locking and unlocking said hub lock.

11. A pulse actuated interlocking mechanism as defined in claim 10 wherein the latch couplings are provided with mated guideways that insure aligned axial relative movement of the pistons, one of the couplings provided with a spring finger and the other coupling provided with first, second and third guide surfaces and a land surface intermediate the first and second guide surfaces, said spring finger from a starting position being deflected by said first guide surface and onto the land surface in response to compression of the piston assembly by the first force level, and said spring finger deflected by said second guide surface and onto the third guide surface in response to compression of the piston assembly by the second force level, and said spring finger deflected by said third guide surface and back to its starting point in response to expansion of the piston assembly by said springs.

* * * * *